2,987,635
SELF-STARTING SWITCHLESS RECIPROCATING ELECTRIC MOTOR
Leonard C. Nachtman, 62—82 Saunders St., Rego Park, L.I., N.Y., and John Dunay, 1013 Maple Drive, New Milford, N.J.
Filed July 18, 1956, Ser. No. 598,554
2 Claims. (Cl. 310—29)

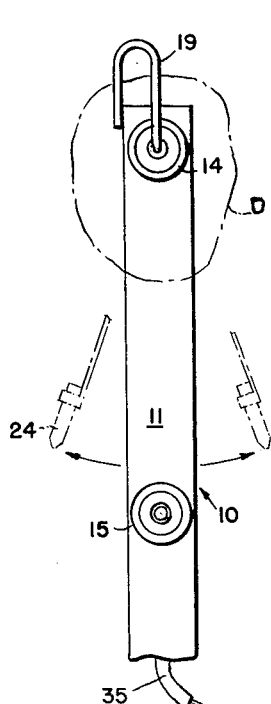
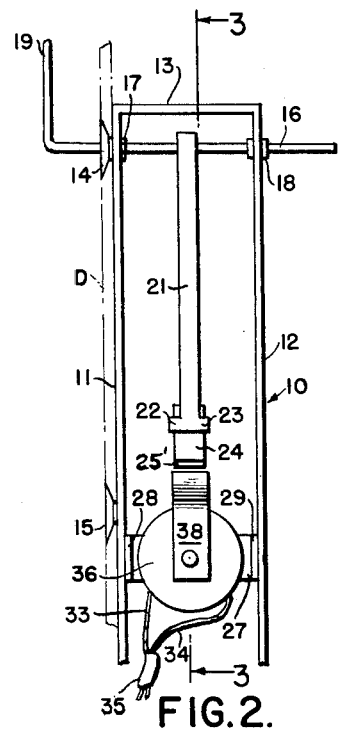
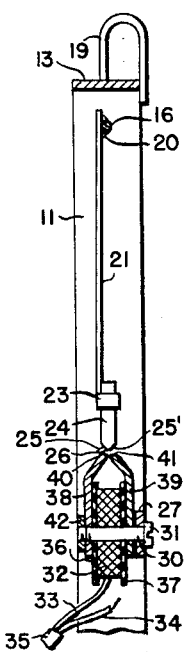
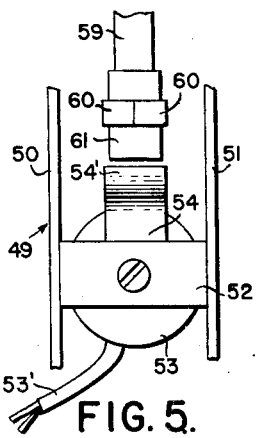
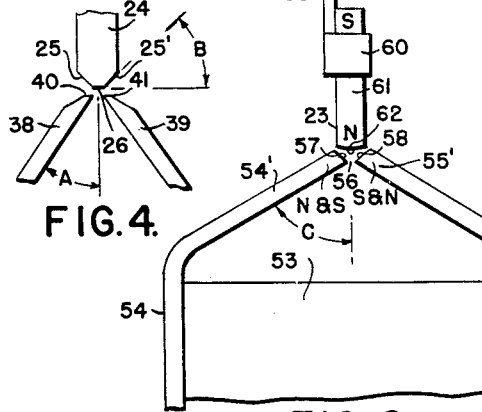
FIG. 1. FIG. 2. FIG. 3. FIG. 4. FIG. 5. FIG. 6.
INVENTORS
Leonard C. Nachtman
John Dunay
BY
L. S. Saulsbury
ATTORNEY 2,987,635
Patented June 6, 1961

This invention relates to a self-starting, switchless reciprocating electric motor adapted for use in the display and advertising fields.

It is an object of the present invention to provide an inexpensive reciprocating electric motor for use in the display and advertising fields which can be powered by alternating current available from the usual outlet on the premises where the display is being animated.

It is another object of the invention to provide a self-starting, switchless reciprocating electric motor, which does not need an electric switch for its operation to make and break the circuit but wherein the interruption is effected by the alternating cycle of current flow through the electromagnet and the timing therewith of the permanent magnet moving like a pendulum over the projections of the electromagnet.

It is still another object of the invention to provide a reciprocating electric display motor in which a permanent magnet mounted on the end of a pendulum is alternately attracted and repelled toward and from the poles of an alternating current electromagnet while moving through magnetic lines of force flowing between the poles thereof.

It is a further object of the invention to provide a reciprocating electric motor in which the pole ends of the alternating current electromagnet are brought into close proximity with one another to concentrate the lines of force passing between them and the permanent magnet or magnets mounted on the end of a swinging arm being brought so that only the pole ends thereof pass into the magnetic field which is alternately set up by the electromagnet.

Other objects of the invention are to provide an alternating current self-starting, switchless reciprocating electric display motor, that has the above objects in mind, which is simple in construction, easy to assemble and wire, inexpensive to manufacture, light in weight, compact, durable, easy to install in the display piece, effective and efficient in use.

For other objects and for a better understanding of the invention, reference may be had to the following detailed description taken in connection with the accompanying drawing, in which FIGURE 1 is a front elevational view of the switchless alternating current reciprocating electric display motor embodying the features of the present invention and constructed according to one form thereof, and illustration made as to the manner in which the permanent magnet pendulum swings, FIG. 2 is a side elevational view of the reciprocating motor shown in FIG. 1, FIG. 3 is a vertical sectional view of the motor as viewed on line 3—3 of FIG. 2, FIG. 4 is an enlarged fragmentary elevational view of the ends of the magnets of the motor, FIG. 5 is a fragmentary side elevational view of another form of the invention in which a larger electromagnetic coil than used in the first form of the invention is employed to handle heavy duty displays and the pole pieces of both the permanent and electromagnet being of different shape than the first form, and FIG. 6 is another fragmentary side elevational view of the electric motor shown in FIG. 5 with illustration made as to the manner in which the electromagnet is energized and the coaction of the permanent magnet therewith.

Referring now particularly to FIGS. 1 to 4, 10 represents a U-shaped frame member having front and rear legs 11 and 12 and a closed top horizontal portion 13. On the front leg 11 are attaching discs 14 and 15 for the purpose of fixing the motor to the rear face of a cardboard display member D by entering the discs through keyhole openings therein. Journaled in the upper ends of the legs 11 and 12 and beneath the horizontal portion 13 is a pivot shaft 16. The attaching disc 14 has a bearing portion 17 through which the shaft 16 extends and the leg 12 has a bushing 18 that supports the shaft at the other side of the frame 13. The shaft is journalled in these bushings and its front end has a hook arm 19 that will operate over the front of the display device and to which the animated member of the display is connected. Secured to the shaft 16 within the frame 10 as by solder 20, is a pendulum arm 21 having gripping fingers 22 and 23 on the lower end thereof which are folded over a permanent magnet bar 24 to secure the same to the arm. The lower end of this magnet bar 24 has tapered end faces 25 and 25′ and a narrow flat end face 26 disposed between them. The tapered faces on the sides of the end of the magnet run at approximately forty-five degrees from a horizontal plane as indicated at B and the width of the bottom face 26 is less than one third of the total width of the magnet as shown. With any larger thickness of the magnet than shown the width of the end face should be kept to a minimum and no larger than this width of the end face 26.

On the lower ends of the legs 10 and 11 and extending transversely therebetween is a transverse spacing and supporting member 27 of U-shape and having legs 28 and 29 in flush engagement with the inner faces of the frame legs 11 and 12, and secured thereto by solder or any other suitable means. Mounted on this supporting member by means of a bolt 30 extending centrally through the transverse member 27 and having a screw head portion 31 engaging therewith, is an electro-magnetic coil 32 having wires 33 and 34 of a cable 35 connected therewith. The cable may have a plug adapted to be inserted in any 110-volt outlet that can be found on the premises where the advertising display is being made. The bolt 30 is of steel and serves as a central core for the coil 32. On the opposite sides of the coil are insulating discs 36 and 37 and in flush engagement with these insulating discs and mounted upon the bolt 30 are respectively vertically-extending magnetizable metal pole pieces 38 and 39 that are bent toward one another at their upper ends so as to define an angle A of about thirty degres with a vertical axis and so that end faces 40 and 41 are brought into close nested relationship with one another and the narrow end face of the magnet 24. A small gap no greater than the order of three thirty-seconds of an inch or thirty one thousandths of an inch is allowed between the end faces 40 and 41. The ends 40 and 41 are flattened on their upper surfaces to a width no greater than three thirty-seconds of an inch. The bottom narrow end face 26 of the magnet 24 lies parallel to these flattened end faces and with only a minimum clearance of no greater than one sixteenth of an inch therebetween. These pole pieces 38 and 39 are connected to the bolt 30 so as to provide a closed magnetic circuit through the coil 32 yet open at their upper ends to provide a magnetic field therebetween. The pole pieces 38 and 39 are tightened against the insulating discs 36 and 37 as the bolt 30 is tightened into a nut 42.

With alternating current passing through the coil 32 the polarity of the end faces 40 and 41 of the pole pieces alternately change sixty times per second with the usual sixty-cycle current supply being used. The spacing of the pole end faces 40 and 41 and of the magnet 24 relative thereto is critical and beyond the spacing of one eighth of an inch of the pole faces and the end of the permanent magnet beyond a bare minimum the motor would at least fail to be self-starting. The width of the pole end faces 40 and 41 and of the end of the magnet 24 can be of any amount but the air gap spacings must be the same regardless of the width. Also, the shape of the end faces and of the end of the magnet 24 may be varied slightly so long as the spacings are not altered thereby.

The strength of the permanent magnet 24 is also critical. It is made of high powered alnico usually designated in the trade as Nos. 5 and 6 or by some other designation indicating its equivalent strength. A magnet of No. 2 strength by the same scale would not be satisfactory. These magnets are taken from an ingot rod and are broken off at weakened sections to provide the individual magnets. The end face of the magnet 24 is filed or ground to provide its desired shape. The magnet may also be cast from sintered or any other suitable metal to eliminate or at least minimize the need for filing or grinding the end face thereof.

The pole end faces 40 and 41 as illustrated in FIG. 4 change their polarity while the polarity of the permanent magnet remains the same. Assuming that the lower end of the permanent magnet 24 has an "N" polarity and the pole faces 40 and 41 are constantly changing their polarity between "N" and "S," it will first be attracted to the one pole as it approaches the pole from a downward swing and immediately after it has been attracted and its inertia has carried it by the pole, it will be repelled by this same pole and then attracted and repelled by the other pole so that it swings over and beyond this other pole until acted upon by gravity for its return. The pendulum magnet will then swing in the opposite direction and a similar cycle of force will be applied to return the magnet 24 to the beginning side of the motor. This movement will continue alternately as long as the motor is being supplied with alternating electric current. The permanent magnet is thus given four propulsions each time it swings in one direction. The shorter the pendulum arm the greater will be the speed of the oscillating movements and the length of the pendulum is also somewhat critical for given strengths and spacings of the magnets. The pendulum should be about three and one half inches in length from the shaft 16 to the end face 26.

Referring now to FIGS. 5 and 6, there is shown a reciprocating motor having a larger magnetic coil and pole pieces differently shaped than the pole pieces of the first form of the invention. A U-shaped frame 49 is formed of a flat metal strip the same as above and has depending spaced legs 50 and 51 separated from one another by a transversely-extending box frame 52 in which is secured by a screw bolt 52' a magnetic coil 53 that has a supply cable 53'. Pole pieces 54 and 55 extend upwardly from the box frame 52 and have respective pole ends 54' and 55' bent toward one another, each one at an angle C of forty-five degrees with a vertical axis, and separated by a minimum clearance of no more than one thirty-second of an inch as indicated at 56. End faces 57 and 58 are flat squared and are angled in relation to one another by approximately ninety degrees. The thickness of the pole pieces should not run more than three thirty-seconds of an inch in order to provide end faces 57 and 58 discharging sufficient lines of force to create the necessary flux for effecting the operation of the motor. If the thickness is greater than say one eighth of an inch the ends should be tapered so as to bring the widths of the end faces to three thirty-seconds of an inch.

A depending pendulum arm 59 has foldable attaching clip portions 60 that secure a permanent magnet 61 to the end thereof. The lower end of this magnet is slightly rounded as indicated at 62 and is brought as close to the upper edges of the end faces of the pole end faces 57 and 58 as possible to minimum clearance and with no greater spacing therebetween than a one thirty-second of an inch. These spacings are critical and any great departure from them will render the device inoperative. The rounded end face 62 of the permanent magnet 61 is formed of an arc of less length than the length of the arm.

The operation of this motor is similar to the motor above described. The porality of the end faces 57 and 58 constantly change at the rate of sixty times per minute so that there are in sequence attracting and repelling forces placed upon the permanent magnet 61. The immediate surge of power to the magnet coil automatically causes the pendulum to start its swinging movement.

It should now be apparent that by this invention, there has been provided a reciprocating display motor that is inexpensive to manufacture, switchless and self-starting.

While various changes may be made in the detail construction, it shall be understood that such changes shall be within the spirit and scope of the present invention as defined by the appended claims.

What is claimed is:

1. A self-starting, switchless, reciprocating electric motor for use with display and advertising devices comprising a frame, an alternating current electromagnet fixed to said frame and having pole pieces extending from the electromagnet and bent inwardly toward each other to provide a small space therebetween, a free swinging pendulum arm pivoted on said frame and having a permanent magnet depending from its lower end so that one pole end thereof passes through and out of the alternating magnetic field generated at the ends of the pole pieces of the electromagnet, and said inwardly bent ends of the pole pieces converging toward each other and each end running at an angle of about thirty degrees with a vertical axis between the pole piece ends, the ends of said pole pieces being flattened to a width no greater than three thirty-seconds of an inch and said permanent magnet having tapered sides and the end face thereof being narrow and no greater than one sixteenth of an inch in width.

2. A self-starting, switchless, reciprocating electric motor for use with display and advertising devices comprising a frame, an alternating current electromagnet fixed to said frame and having pole pieces extending from the electromagnet and bent inwardly toward each other to provide a small space therebetween, a free swinging pendulum arm pivoted on said frame and having a permanent magnet depending from its lower end so that one pole end thereof passes through and out of the alternating magnetic field generated at the ends of the pole pieces of the electromagnet, and the ends of the pole pieces converging toward each other and each end running at an angle of about forty-five degrees with each other and having squared end faces, the end faces of the pole pieces having a thickness no greater than three thirty-seconds of an inch and the lower edges of the end faces coming together to leave a space no greater than one thirty-second of an inch, the end face of said permanent magnet being rounded along an arc of less radius than the length of the pendulum arm, said rounded end face lying no greater than one sixteenth of an inch from the upper edges of the end faces of the pole pieces.

References Cited in the file of this patent

UNITED STATES PATENTS

| 2,036,917 | Favre-Bulle | Apr. 7, 1936 |

FOREIGN PATENTS

| 594,884 | Great Britain | Nov. 21, 1947 |
| 1,034,804 | France | Apr. 15, 1953 |